W. G. R. BRAEMER.
AIR PURIFYING APPARATUS.
APPLICATION FILED JULY 19, 1911.
1,040,499.
Patented Oct. 8, 1912.
2 SHEETS—SHEET 1.
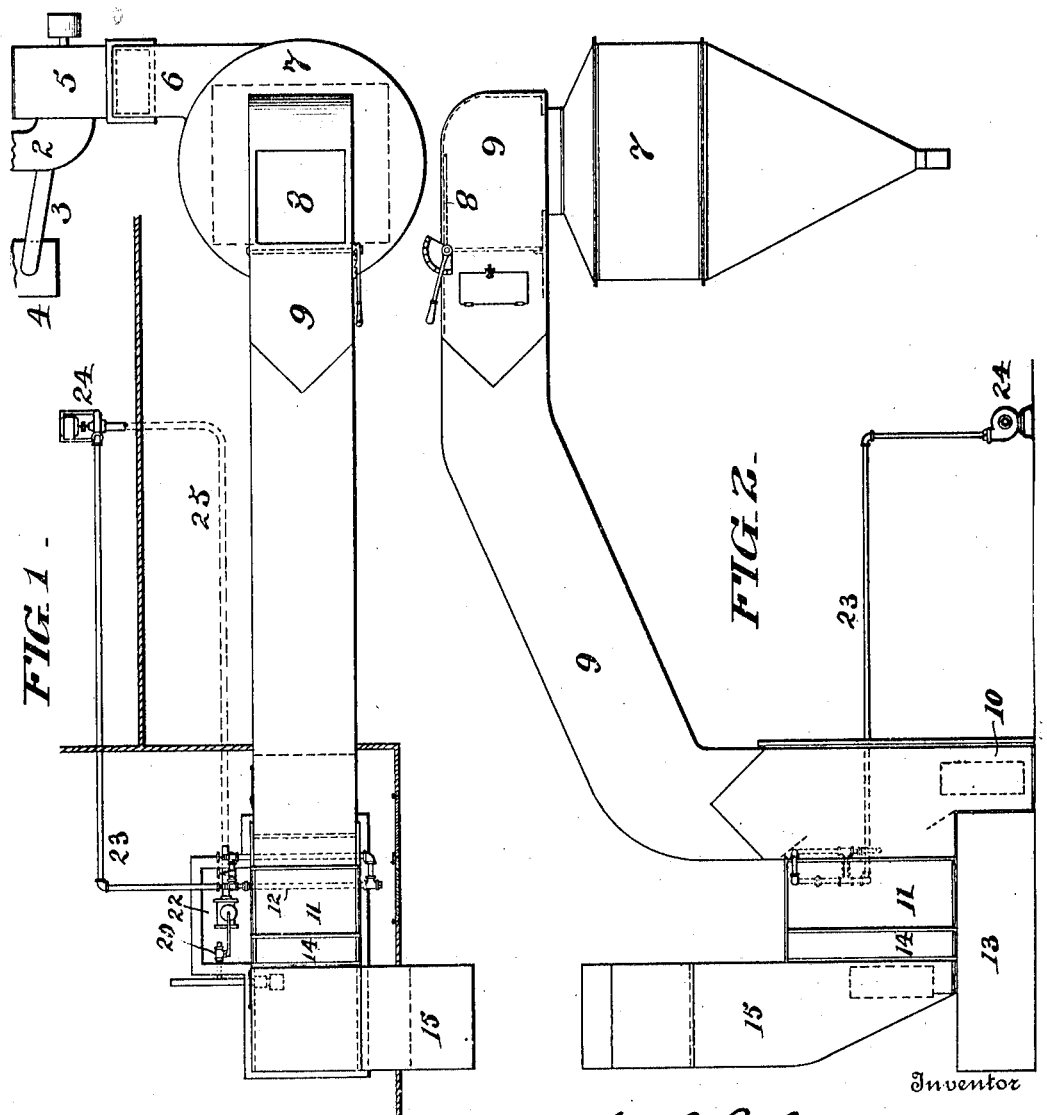

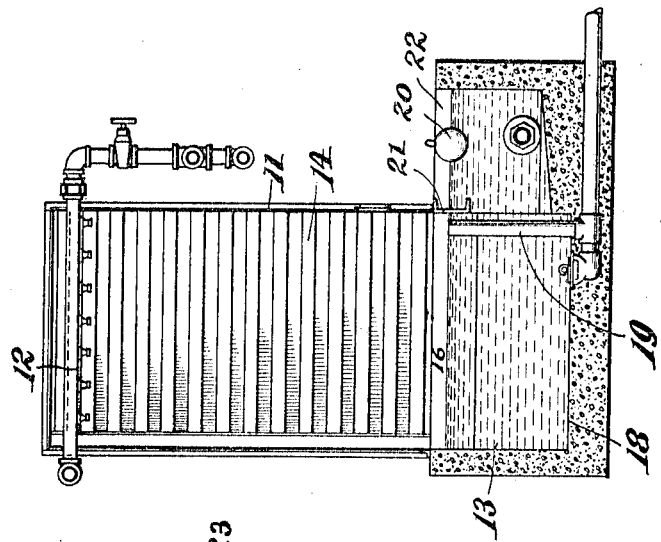
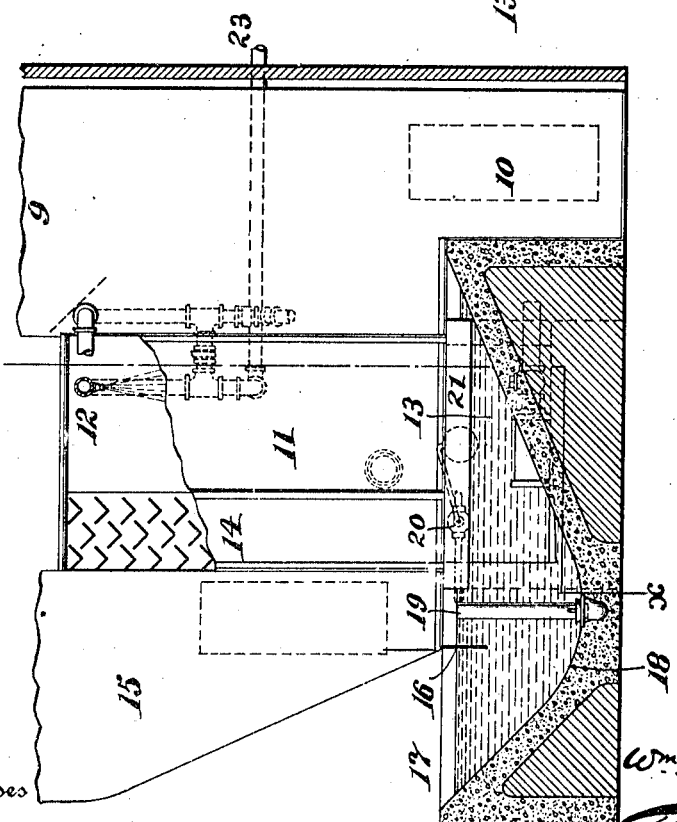

UNITED STATES PATENT OFFICE.

WILLIAM G. R. BRAEMER, OF CAMDEN, NEW JERSEY, ASSIGNOR TO WARREN WEBSTER & COMPANY, A CORPORATION OF NEW JERSEY.

AIR-PURIFYING APPARATUS.

1,040,499.   Specification of Letters Patent.   Patented Oct. 8, 1912.

Application filed July 19, 1911. Serial No. 639,257.

*To all whom it may concern:*

Be it known that I, WILLIAM G. R. BRAEMER, a citizen of the United States, and a resident of the city of Camden, county of Camden, State of New Jersey, have invented an Improvement in Air-Purifying Apparatus, of which the following is a specification.

My invention has reference to air purifying apparatus and consists of certain improvements which are fully set forth in the following specification and shown in the accompanying drawings which form a part thereof.

The object of my invention is to provide a construction of apparatus which may be employed in mills for conveying the dust or fine particles carried by the air from the machines and subjecting the same to a purifying treatment by water spray, the suspended dust or particles being washed out of the air and collected in a reservoir of water from which it may be recovered.

More particularly, my invention is intended for use in conjunction with a usual form of dust and shaving exhauster and collector, so that the air which is treated to the water spray will have been separated from the heavier particles of suspended matter before being washed.

My invention consists in a conduit leading from the mill and through which air is forced under the action of a blower, combined with a centrifugal dust separator for removing heavy suspended matter on its way through the conduit, and an air washing apparatus at the discharge end of the conduit for treating the partly purified air to water spray for washing therefrom the fine suspended dust or lighter particles which it still contained.

My invention also comprehends many details of construction which, together with the features above specified, will be better understood by reference to the drawings, in which:

Figure 1 is a plan view of an air purifying apparatus embodying my invention; Fig. 2 is an elevation of the same; Fig. 3 is a side elevation of the air washer proper with part in section; and Fig. 4 is a cross sectional elevation of the same on line $x$—$x$.

2 is a conduit extending through the building and having lateral branches 3 leading from the machines 4 which, in their operation, produce the objectionable dust. The conduit 2 connects with a blower 5 by which a suction is produced in said conduit 2 to draw the dust to the blower. The dust is forced or blown from the blower 5 through the conduit 6 into the dust separator 7 of any ordinary construction, said separators being arranged to separate the dust and suspended matter from the air under centrifugal action. Instead of the air escaping from the separator 7 into the atmosphere, it is delivered into the conduit 9 leading to the air washer. This conduit 9 may be provided with a large pivoted valve 8 which when in horizontal position closes an outlet to the atmosphere and provides passage for the air to the air washer, but which valve, when turned downward as indicated in dotted lines in Fig. 2, will close off the air from the air washer and permit it to escape into the atmosphere. This valve may be of any suitable construction. It will now be seen that the heavier particles which pass through the blower 5 are separated from the air by the separator 7 and discharged at the bottom, so that the air which passes through the conduit to the air washer will contain in suspension the finer particles only of the dust from the machines; and these fine particles may be removed by the water spray to such an extent as to leave the air in a purified condition when it escapes through the conduit 15 into the atmosphere.

Referring now to the air washer apparatus above referred to, 13 is a concrete tank over which is arranged the spray chamber 11 and the eliminator 14. The eliminator 14 may be of any ordinary construction, being provided with baffles against which the moist air is forced and by which the excessive moisture is separated from the air and returned to the tank 13. The spray chamber 11 opens into the bottom of the conduit 9 and is provided with a spray pipe 12 to provide a sheet of spray water through which the dust laden air is required to pass. The water to the spray pipe 12 is supplied by a pump 24 which sucks water from the tank 13 by a suction pipe 25 and delivers it by a supply pipe 23 to the spray pipe 12. The down take of the conduit 9 may terminate at its extreme bottom in a dust pit 10 where any heavier particles of dust may collect should they escape the separator 7.

The tank 13 is of greater length than the spray chamber 11 and baffle chamber 14 so as to provide an open portion 17, said part being separated at the surface of the water from the main portion by a sealing plate 16 which extends down into the water. The bottom of the tank 13 inclines from each end and is rounded on the lower portion, as indicated at 18. By this means the dust which is washed out of the air into the tank by the spray water will settle to the lowest portion of the tank and may be raked forward up the incline out of the open portion 17. The tank is provided with an overflow pipe 19 to restrict the normal level to that required. This tank 13 is also provided with a lateral compartment 22 open to the atmosphere and in which the suction strainer to the suction pipe 25 and also the float valve 20 for supplying fresh water to compensate for that carried off by the air and the overflow. A channel beam 21 is extended over the tank between the parts 13 and 22 thereof and upon which the sides of the spray chamber and eliminator chamber rest, and extending down into the water acts as a seal against the escape of air. It will be seen that by this construction the air is confined within the washer above the water in passing from the conduit 9 to the escape conduit 15, while at all times an access may be had to the tank 13 for cleaning purposes.

This apparatus may be utilized solely for cleansing the air of objectionable matter before permitting it to escape into the atmosphere, but in certain cases the materials extracted from the air by the air washer are valuable and are recovered in the tank 13 for further use.

I have shown my improved apparatus in the form which I have adopted for commercial practice and which I have found excellently adapted to the objects of my invention, but I do not restrict myself to the details of construction as these may be modified in various ways without departing from the spirit of the invention.

Having now described my invention what I claim as new and desire to secure by Letters Patent, is:

1. In an air purifying apparatus, the combination of a closed conduit leading from a source of dust and particles and discharging into the atmosphere, a blower in the conduit, a separator in constant operative relation in the conduit for separating the heavier particles from the air, an air washer having a water spray for washing the finer particles of dust from the air immediately before the air escapes into the atmosphere, and means for directing the air leaving the separator directly into the atmosphere or causing it to pass through the conduit to the air washer.

2. In air purifying apparatus, the combination of a conduit for conveying air from a source of dust and delivering the purified air to the atmosphere, with means for separating the heavier particles of dust from the air passing through the conduit, said means consisting of an air washing chamber, an inclosed tank below the air washing chamber and having an inclined bottom, said tank having a portion opening laterally to the atmosphere and communicating at its bottom with the deepest part of the inclined bottom of the inclosed tank, and a water seal at the upper part of the tank and between the inclosed and open portions thereof.

3. In air purifying apparatus, the combination of a conduit for conveying air from a source of dust and delivering the purified air to the atmosphere, with means for separating the heavier particles of dust from the air passing through the conduit, said means consisting of an air washing chamber, an inclosed tank below the air washing chamber and having an inclined bottom, said tank having a portion opening laterally to the atmosphere and provided with an inclined bottom whose lowest portion communicates with the deepest part of the inclined bottom of the inclosed tank whereby the collected dirt may be readily raked out of the inclosed tank without interfering with the normal operation of the apparatus, and a water seal at the upper part of the tank and between the inclosed and open portions thereof.

4. In an air purifying apparatus, a water tank having an inclosed portion and a portion open to the atmosphere, the bottom of the tank being inclined and the inclination leading from below the inclosed portion thereof and extending in a sloping manner to the upper part of the open portion thereof, whereby the collected dust and dirt may be raked from the inclosed portion of the tank without interference with the continuity of the purifying operation upon the air, in combination with a water spray chamber above the inclosed portion of the tank, means for spraying water within the spray chamber above the inclosed portion of the tank, means for forcing air through the spray chamber and a conduit to lead the purified air to the place of discharge.

5. In an air purifying apparatus, a water tank having an inclosed portion and a portion open to the atmosphere, the bottom of the tank being inclined and the inclination leading from below the inclosed portion thereof and extending in a sloping manner to the upper part of the open portion thereof, whereby the collected dust and dirt may be raked from the inclosed portion of the tank without interference with the continuity of the purifying operation upon the air and said tank also having a lateral compartment open to the atmosphere, in combination with a water spray chamber above the inclosed portion of the tank, means for spraying water within the spray chamber above the inclosed portion of the tank, means for forcing air through the spray chamber and a conduit to lead the purified air to the place of discharge, means for automatically supplying fresh water to the lateral compartment of the tank, an overflow from the inclosed portion of the tank, and means for sucking the water from the lateral compartment of the tank and delivering it to the means for spraying the water.

In testimony of which invention, I hereunto set my hand.

WM. G. R. BRAEMER.

Witnesses:
R. M. KELLY,
D. J. McCLOSKEY.